(12) United States Patent
Tsai

(10) Patent No.: US 6,254,026 B1
(45) Date of Patent: Jul. 3, 2001

(54) APPARATUS FOR ELECTRIC WIRING

(76) Inventor: Chin-Ching Tsai, P.O. Box 82-144, Taiwan (TW)

( * ) Notice: Subject to any disclaimer, the term of this patent is extended or adjusted under 35 U.S.C. 154(b) by 0 days.

(21) Appl. No.: 09/429,489

(22) Filed: Oct. 29, 1999

(51) Int. Cl.[7] ............................. B65H 75/34; H02G 1/08
(52) U.S. Cl. ................................. 242/390.2; 242/390.8; 254/134.3 FT
(58) Field of Search ....................... 242/390.2, 390.8, 242/390.9; 254/134.5, 134.3 FT, 134.3 SC, 134.6, 269, 270

(56) References Cited

U.S. PATENT DOCUMENTS

| | | | | |
|---|---|---|---|---|
| 4,056,859 | * | 11/1977 | Pace | 254/134.3 FT |
| 4,172,563 | * | 10/1979 | Werner et al. | 242/390.2 |
| 4,644,791 | * | 2/1987 | Sonoda et al. | 254/134.3 FT |
| 4,842,108 | * | 6/1989 | Anderson et al. | 242/390.8 |
| 5,440,297 | * | 8/1995 | Bright | 254/134.3 FT |
| 5,505,432 | * | 4/1996 | Noonan | 254/134.3 FT |
| 5,582,392 | * | 12/1996 | Bajric et al. | 254/134.3 FT |
| 5,645,265 | * | 7/1997 | Shu | 254/134.3 FT |
| 6,016,609 | * | 1/2000 | Donovan et al. | 254/134.3 FT |

* cited by examiner

*Primary Examiner*—John M. Jillions
(74) *Attorney, Agent, or Firm*—A & J

(57) ABSTRACT

An apparatus for electric wiring, including a housing having a folding stand and a handle, a reel including a flexible tape, a rolling ball-equipped tape leader detachably connected to the lead end of the flexible tape outside the housing, a motor drive controlled to let off/take up the flexible tape, permitting the lead end of the flexible tape to be moved between the inlet of an electric conduit to the outlet thereof to carry an electric wire through the electric conduit, and photo detectors adapted for detecting the movement of the flexible tape so as to automatically cut off power supply from the motor drive when the flexible tape is fully extended out or retracted.

4 Claims, 6 Drawing Sheets

APPARATUS FOR ELECTRIC WIRING

BACKGROUND OF THE INVENTION

1. Field of the Invention

This invention relates to apparatus for electric wiring, and more particularly to an apparatus for pulling an electric wire through an electric conduit.

2. Description of the Prior Art

When a building is constructed, electric conduits are provided in each house for electric wiring. When an electric wire is to be installed in an electric conduit, a spring wire is used and inserted from one end of the electric conduit to the other end thereof, and then the electric wire to be installed is fastened to the lead end of the spring wire, and then the spring wire is pulled back to carry the electric wire through the electric conduit. This electric wiring method consumes much labor and working time.

SUMMARY OF THE INVENTION

This invention relates to apparatus for electric wiring, and more particularly to an apparatus for pulling an electric wire through an electric conduit.

According to one aspect of the present invention, the apparatus comprises a housing having a folding stand and a handle, a reel including a flexible tape, a rolling ball-equipped tape leader detachably connected to the lead end of the flexible tape outside the housing, and a motor drive controlled to let off/take up the flexible tape, permitting the lead end of the flexible tape to be moved between the inlet of an electric conduit to the outlet thereof to carry an electric wire through the electric conduit. According to another aspect of the present invention, photo detector means is installed inside the housing to detect the movement of the flexible tape, so as to automatically cut off power supply from the motor drive when the flexible tape is fully extended out or retracted.

DETAILED DESCRIPTION OF THE PREFERRED EMBODIMENT

Figure 1:
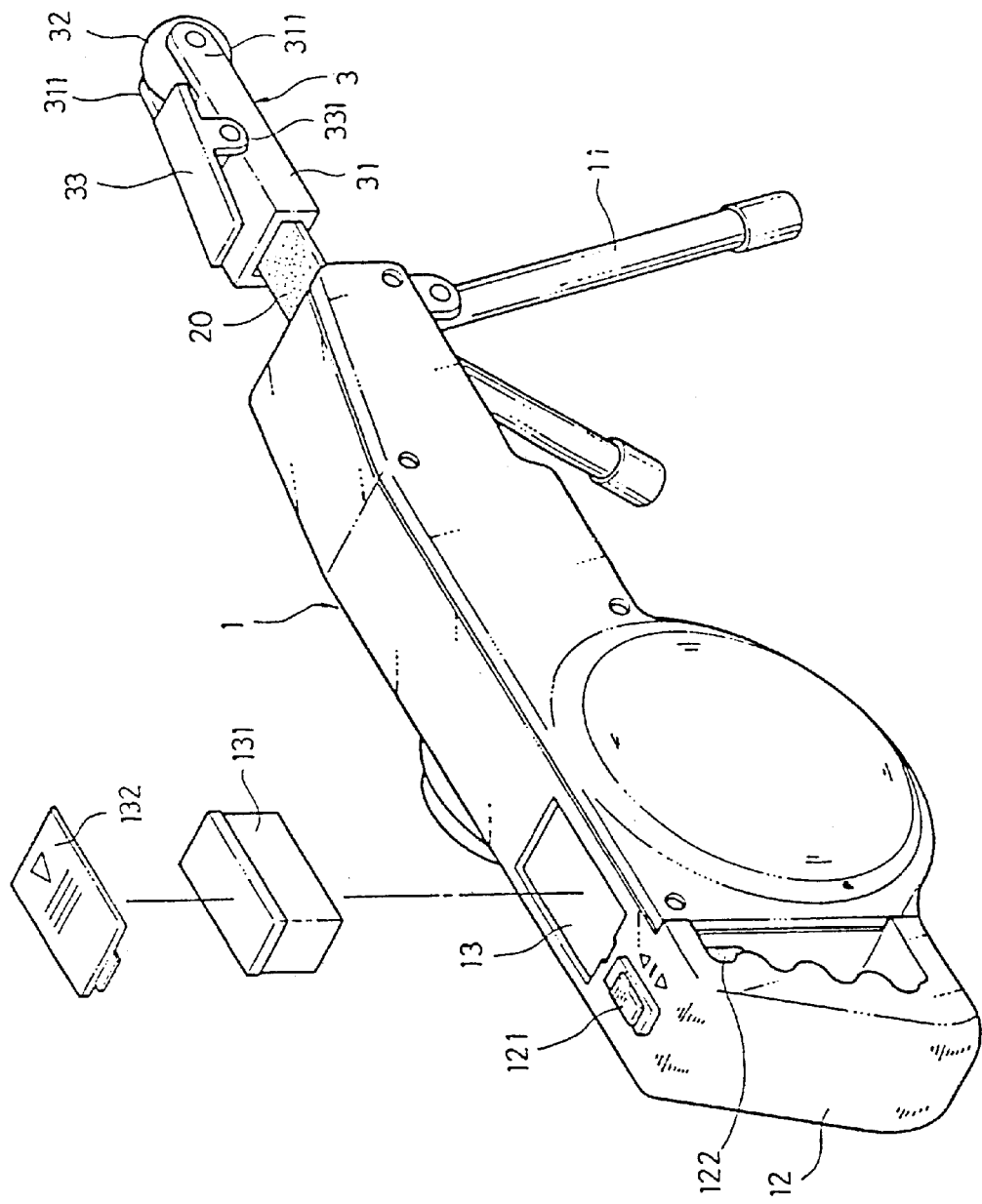
FIG. 1 shows an apparatus for electric wiring according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
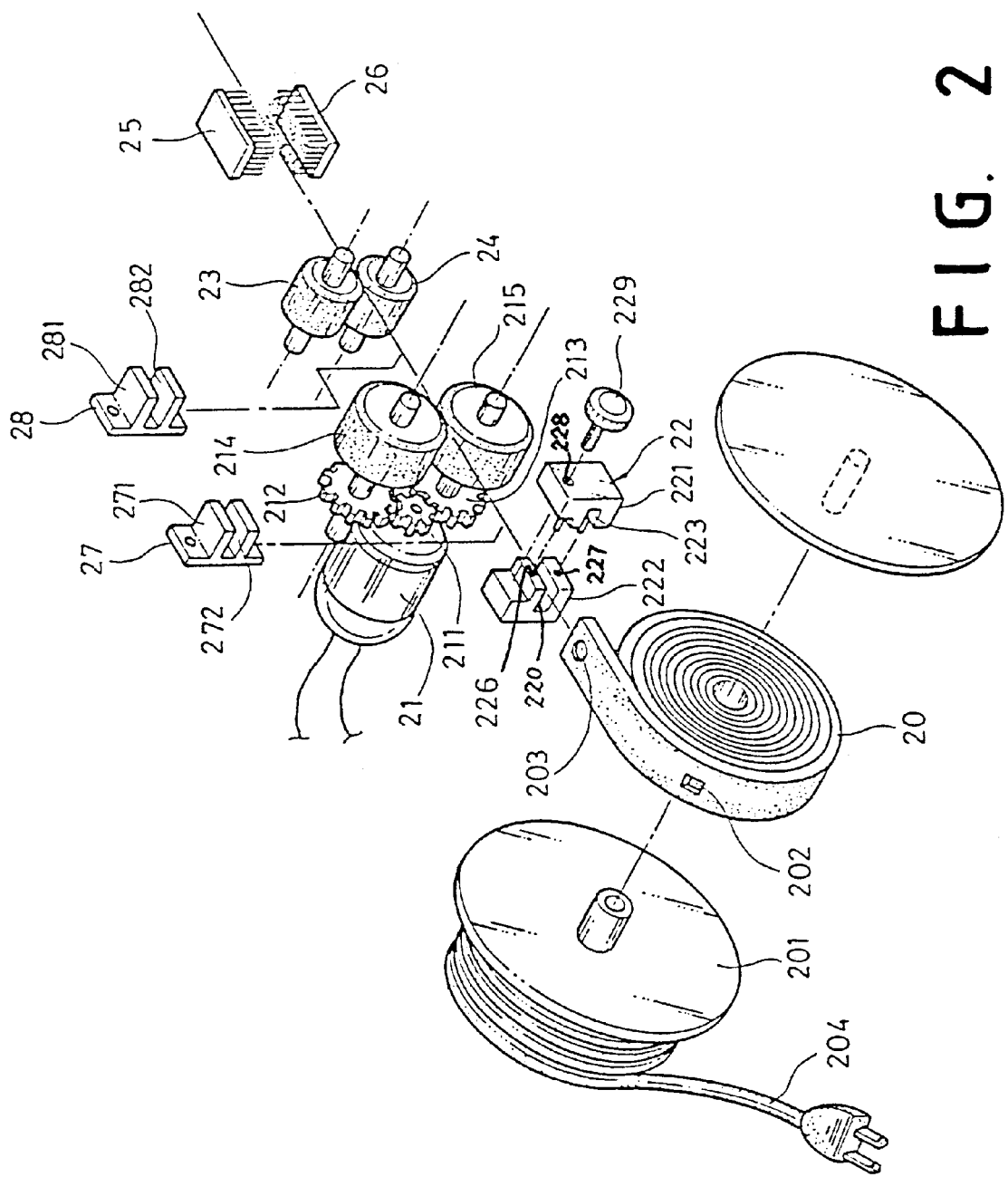
FIG. 2 is an exploded view of the motor drive according to the present invention.
Figure 3:
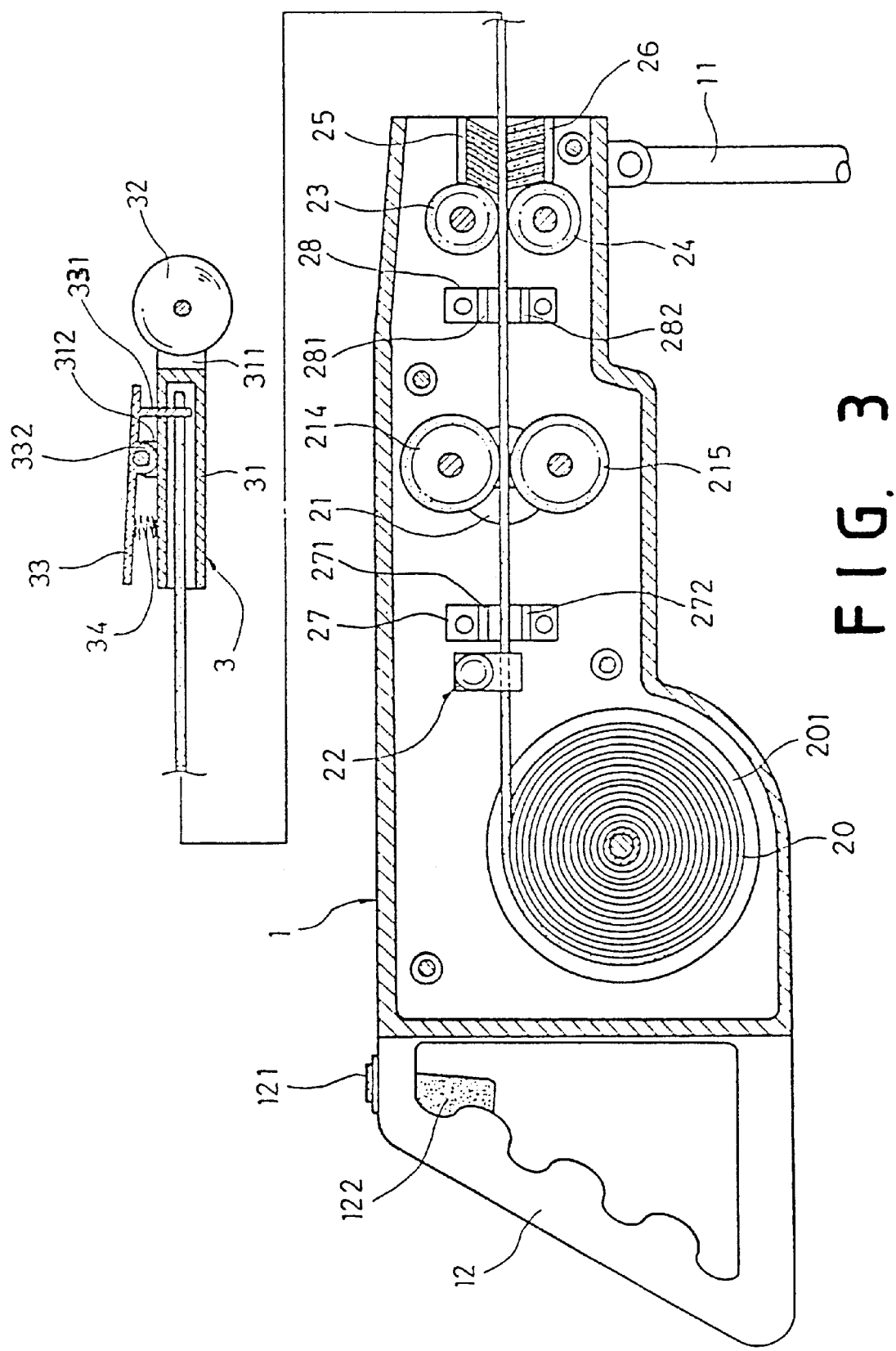
FIG. 3 is a sectional view of the apparatus for electric wiring according to the present invention.

Referring to FIGS. 1, 2, and 3, a apparatus for electric wiring in accordance with the present invention comprises a housing 1. The housing 1 has a folding stand 11 pivotably connected to the bottom of the front open end thereof, a handle 12 fixedly connected to the rear end thereof remote from the folding stand 11, a forward/backward selector switch 121 at the top side of the handle 12, a start (on/off) button 122 at the inner side of the handle 12, a battery chamber 13 at the top side in front of the forward/backward selector switch 121, and a battery lid 132 covered on the battery chamber 13 to hold down a rechargeable battery 131 in the battery chamber 13.

A reel 201 is mounted inside the housing 1, and driven by a reversible motor drive to let off/take up a flexible tape 20. The reversible motor drive is mounted inside the housing 1, comprising a reversible motor 21, a pinion 211 fixedly mounted around the output shaft of the reversible motor 21, a first driven gear 212 and a second driven gear 213 respectively meshed with the pinion 211 at two opposite sides and turned by it in reversed directions, a first driving wheel 214 and a second driving wheel 215 respectively fixedly mounted on the gear shaft of the first driven gear 212 and the gear shaft of the second driven gear 213 at the same side. Two brushes 25, 26 are mounted inside the housing 1 at its front open end, and acted against each other. Two parallel guide rollers 23, 24 are mounted inside the housing 1 and spaced between the brushes 25, 26 and the driving wheels 214, 215. The lead end of the flexible tape 20 is inserted through a locating device 22 inside the housing 1 and retained between the driving wheels 214, 215, and then extended out of the front open end of the housing 1 through the gap between the guide rollers 23, 24, and the gap between the brushes 25, 26. When the forward/backward selector switch 121 is switched to the forward or backward position and the start button 122 is depressed, the reversible motor 21 is driven to turn the driven gears 212, 213 in reversed directions, thereby causing the driving wheels 214, 215 to let off or take up the flexible tape 20. Further, an electric cable 204 may be mounted on the reel 201 for connection to an AC power supply outlet to provide electric power supply to the reversible motor 21 through a transformer (not shown).

Figure 7:
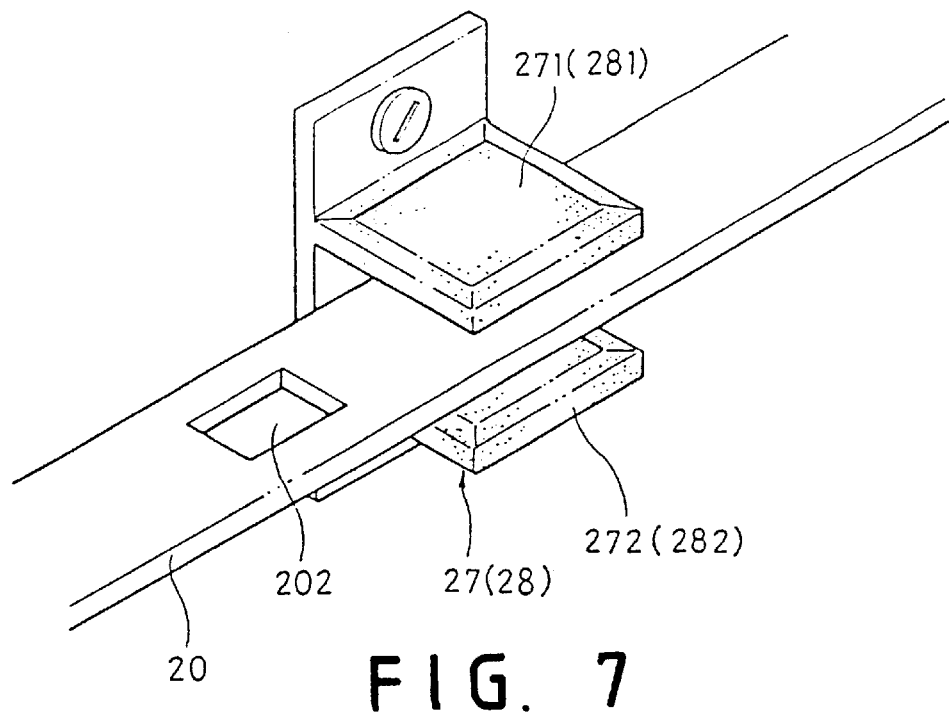
FIG. 7 is an elevational view of a photo detector module according to the present invention.

A first photo detector module 27 and a second photo detector module 28 are respectively mounted inside the housing 1. The first photo detector module 27 is disposed between the driving wheels 214, 215 and the reel 201. The second photo detector module 28 is disposed between the driving wheels 214, 215 and the guide rollers 23, 24. Each photo detector module 27 or 28 comprises a light emitting element 271 or 281, and a photosensitive element 272 or 282 vertically spaced from the light emitting element 271 or 281. When the photosensitive element 272 or 282 receives the light of the light emitting element 271 or 281, the photo detector module 27 or 28 immediately cuts off power supply from the reversible motor 21. The flexible tape 20 has two through holes 202 near the two opposite ends. When one through hole 202 of the flexible tape 20 passes through the gap between the light emitting element 271 or 281 and the photosensitive element 272 or 282, the photosensitive element 272 or 282 is induced, thereby causing the photo detector module 27 or 28 to cut off power supply from the reversible motor 21, to prevent idle running of the driving wheels 214, 215 (see also FIG. 7).

The flexible tape 20 has a coupling hole 203 at the lead end. A tape leader 3 is coupled to the lead end of the flexible tape 20 and secured to the coupling hole 203. The tape leader 3 comprises a box-like mounting frame 31 sleeved onto the lead end of the flexible tape 20, two parallel projecting strips 311 bilaterally forwardly extended from the front end of the box-like mounting frame 31, a rolling ball 32 pivotably connected between the parallel projecting strips 311, a transverse rib 312 raised from the box-like mounting frame 31 at the top, a pressure plate 33 pivoted to the transverse rib 312, and a spring 34 supported between the mounting frame 31 and the rear end of the pressure plate 33. The pressure plate 33 has two downward lugs 332 pivoted to the two opposite ends of the transverse rib 312, and a downward locating pin 331 perpendicularly extended from the bottom side near the front end and forced into the coupling hole 203 of the flexible tape 20. The spring 34 imparts an upward pressure to the rear end of the pressure plate 33, causing the pressure plate 33 to force the locating pin 312 into engagement with the coupling hole 203 of the flexible tape 20. When the rear end of the pressure plate 33 is depressed, the spring 34 is compressed, and the downward locating pin 312 is lifted from the coupling hole 203 of the flexible tape 20, for permitting the lead end of the flexible tape 20 to be disconnected from the box-like mounting frame 31.

Figure 4:
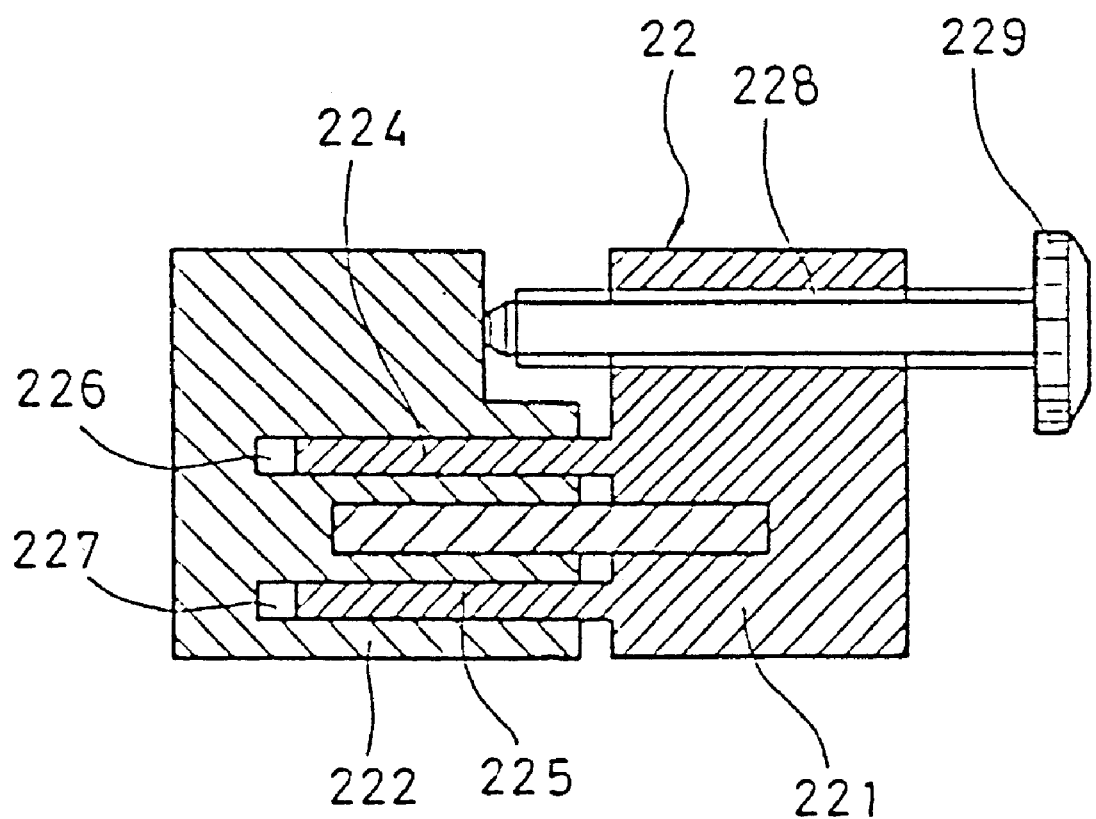
FIG. 4 is a sectional view of the locating device according to the present invention.

Referring to FIG. 4 and FIG. 2 again, the locating device 22 comprises a first block 221, a second block 222, and an adjusting screw 229. The first block 221 has a transverse channel 223 at the front side, two locating pins 224, 225 perpendicularly raised from the front side and vertically spaced by the transverse channel 223, and a screw hole 228 spaced above and in parallel to the locating pins 224, 225. The second block 222 has a transverse channel 220 at the front side facing the transverse channel 223 of the first block 221, and two pin holes 226, 227 vertically spaced by the transverse channel 220. When the locating pins 224, 225 of the first block 221 are respectively inserted into the pin holes 226, 227 of the second block 222, the first block 221 and the second block 222 are coupled together, and the transverse channels 223, 220 are matched together to guide the flexible tape 20. By turning the adjusting screw 229, the width of the tape passage which is defined by the transverse channels 223, 220 is relatively adjusted.

Figure 5:
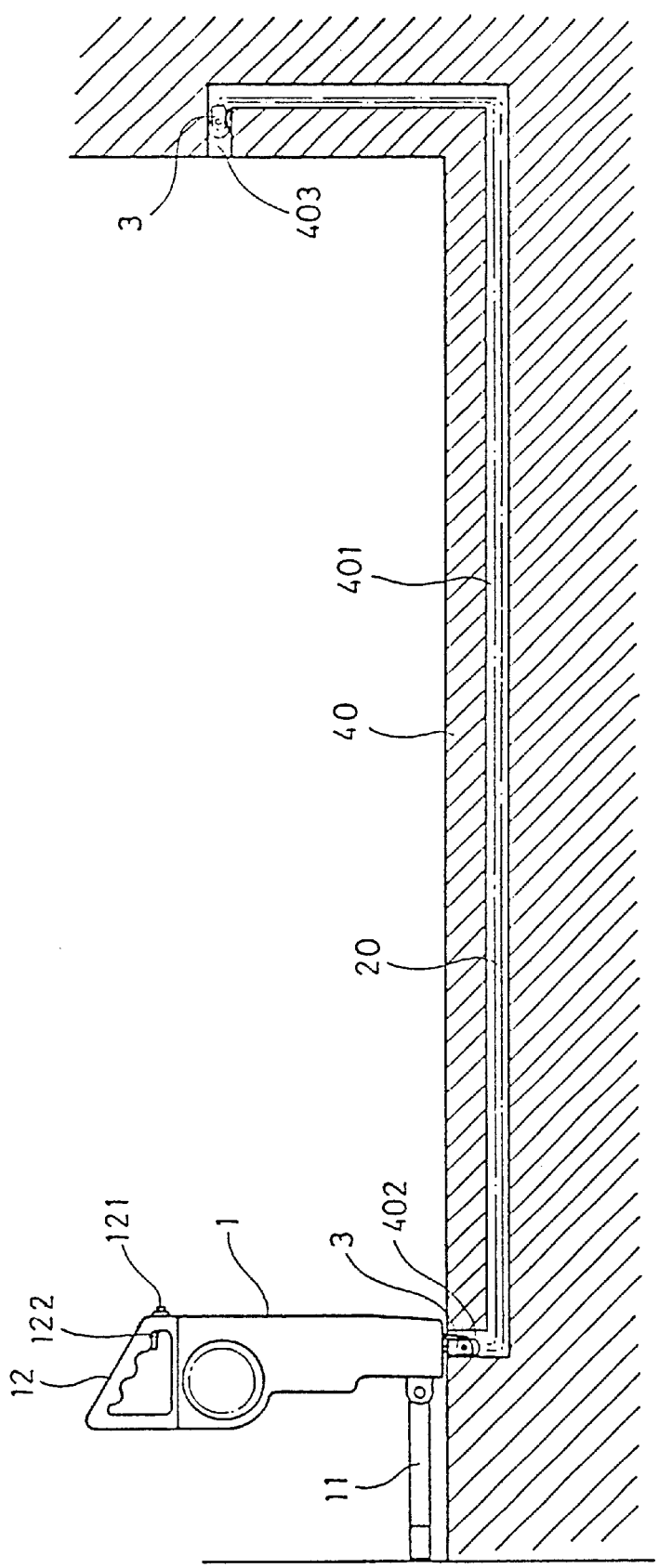
FIG. 5 is an applied view of the present invention, showing the flexible tape moved into the electric conduit.
Figure 6:
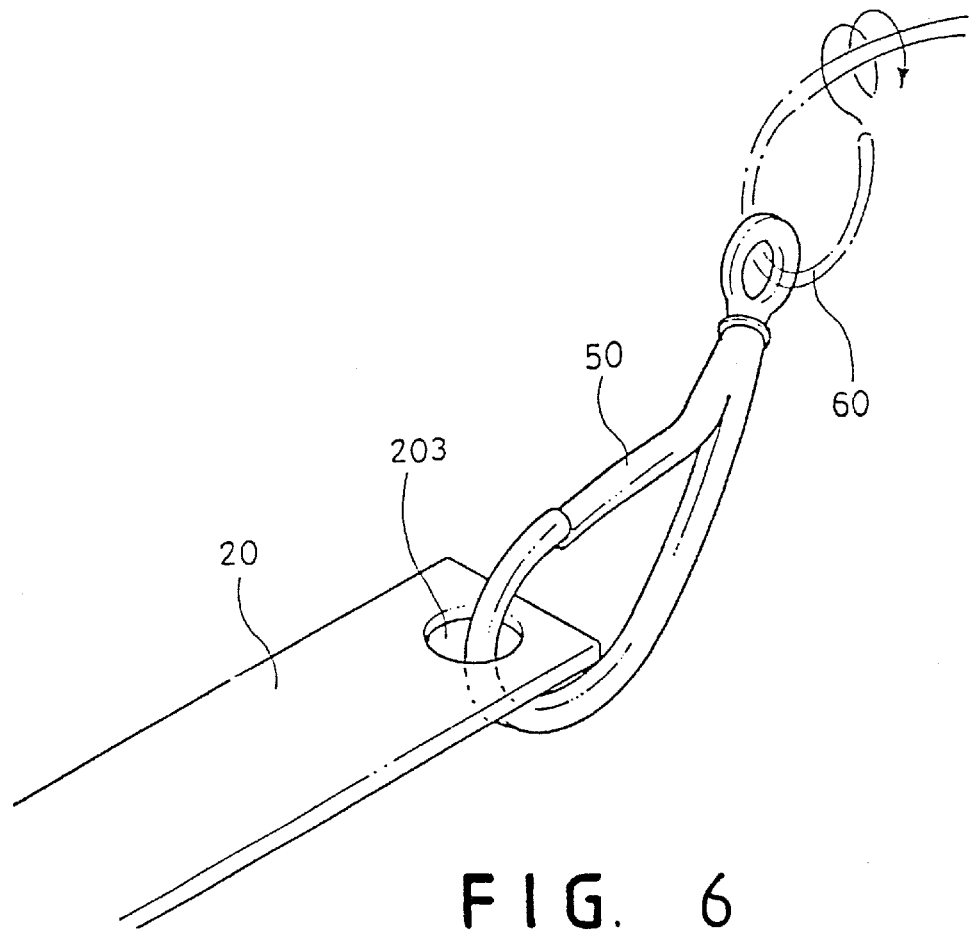
FIG. 6 shows a swivel connected between the coupling hole of the flexible tape and the electric wire to be installed according to the present invention.

Referring to FIGS. 5 and 6, and FIG. 3 again, when in use, the front open end of the housing 1 is attached to the inlet 402 of the electric conduct 401 and supported in place by the folding stand 11. When the forward/backward selector switch 121 is switched to the forward position and the start button 122 is depressed, the reversible motor 21 is turned clockwise to turn the driven gears 212, 213, thereby causing the driving wheels 214, 215 to let off the flexible tape 20. When the flexible tape 20 is continuously let off, the tape leader 3 is forced to move through the electric conduit 401 from the inlet 402 to the outlet 403. When the tape leader 3 is moved out of the outlet 403 of the electric conduit 401, the tape leader 3 is disconnected from the lead end of the flexible tape 20, and then a swivel 50 or like means is fastened to the coupling hole 203 of the flexible tape 20 to secure one end of the electric wire 60 to be installed. When the electric wire 60 is connected to the lead end of the flexible tape 20 by the swivel 50, the forward/backward selector switch 121 is switched to the backward position and the start button 122 is depressed again to turn the reversible motor 21 counter-clockwise, thereby causing the driving wheels 214, 215 to take up the flexible tape 20 and the electric wire 60. Therefore, the electric wire 60 pulled into the electric conduit 401 toward the inlet 402.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An apparatus for electric wiring, comprising:

a housing having a folding stand pivotably connected to a bottom side of a front end thereof, a handle fixedly connected to a rear end thereof remote from said folding stand, a forward/backward selector switch and an on/off switch respectively mounted on said housing;

a reel including a flexible tape mounted inside said housing, said flexible tape having a lead end, a tail end, a coupling hole at said lead end, and two through holes respectively disposed near said lead end and said tail end;

a battery power supply unit mounted inside said housing and controlled by said on/off switch;

a motor drive connected to said battery power supply unit through said on/off switch and said forward/backward selector switch, and controlled by said on/off switch and said forward/backward selector switch to move said flexible tape, causing said flexible tape to be let off from said reel or taken up by said reel, said motor drive comprising a reversible motor controlled by said forward/backward selector switch to turn forwards or backwards and having an output shaft, a pinion fixedly mounted around the output shaft of said reversible motor, two driven gears respectively meshed with said pinion at two opposite sides and turned by the pinion in reversed directions, two driving wheels attached to said flexible tape at two opposite sides and respectively turned by said driven gears to move said flexible tape forwards/backwards;

photo detector means mounted inside said housing between said reel and the front open end of said housing, said photo detector means being induced to cut off power to said motor drive when one of the through holes of said flexible tape passes;

a locating device mounted inside said housing and adapted for supporting and guiding said flexible tape, said locating device comprising a first block and a second block coupled together, said first block comprising a transverse channel through which said flexible tape passes, and two locating pins perpendicularly raised from a front side thereof and vertically spaced by the transverse channel of said first block, said second block comprising a transverse channel through which said flexible tape passes, and two pin holes perpendicularly raised from a front side thereof and vertically spaced by the transverse channel of said second block and respectively coupled to the locating pins of said first block; and, a tape leader connected to the lead end of said flexible tape outside said housing for securing one end of the electric wire to be installed, said tape leader comprising a box-like mounting frame detachably sleeved onto the lead end of said flexible tape, two parallel projecting strips bilaterally forwardly extended from one end of said box-like mounting frame, a rolling ball pivotably connected between said parallel projecting strips and turned about an axis, a transverse rib raised from said box-like mounting frame, a pressure plate having two downward lugs bilaterally disposed in the middle and respectively pivoted to two opposite ends of said transverse rib and a downward front locating pin adapted for inserting into the coupling hole of the lead end of said flexible tape to secure said tape leader to said flexible tape, and a spring connected between said mounting frame and one end of said pressure plate, said spring imparting an upward pressure to one end of said pressure plate remote from said downward front locating pin, causing said pressure plate to force said downward front locating pin into engagement with the coupling hole of the lead end of said flexible tape.

2. The apparatus as claimed in claim 1, further comprising two parallel guide rollers mounted inside said housing and spaced between the front open end of said housing and the driving wheels of said motor drive and attached to said flexible tape at two opposite sides to guide said flexible tape.

3. The apparatus as claimed in claim 1, further comprising two brushes mounted inside the front open end of said housing and facing each other and respectively disposed in contact with said flexible tape at two opposite sides for removing dust from it.

4. The apparatus as claimed in claim 1, wherein said location device further comprising an adjusting screw threaded into a screw hole in said first block and stopped against the front side of said second block and turned to adjust the pitch between said first block and said second block.

* * * * *